United States Patent
Pelouch et al.

(10) Patent No.: US 8,145,062 B2
(45) Date of Patent: Mar. 27, 2012

(54) OPTICAL AMPLIFIER CAPABLE OF AMPLIFYING OPTICAL SIGNALS THAT TRAVERSE SEPARATE TRANSMISSION FIBERS

(75) Inventors: Wayne S. Pelouch, McKinney, TX (US); Do-Il Chang, Allen, TX (US); Herve A. Fevrier, Plano, TX (US)

(73) Assignee: Xtera Communications, Inc., Allen, TX (US)

( * ) Notice: Subject to any disclaimer, the term of this patent is extended or adjusted under 35 U.S.C. 154(b) by 607 days.

(21) Appl. No.: 12/350,071

(22) Filed: Jan. 7, 2009

(65) Prior Publication Data

US 2009/0175628 A1    Jul. 9, 2009

Related U.S. Application Data

(60) Provisional application No. 61/019,467, filed on Jan. 7, 2008, provisional application No. 61/019,577, filed on Jan. 7, 2008, provisional application No. 61/019,574, filed on Jan. 7, 2008.

(51) Int. Cl.
*H04B 10/12* (2006.01)

(52) U.S. Cl. ........ 398/141; 398/140; 398/142; 398/160; 398/200

(58) Field of Classification Search .......... 398/140–142, 398/160, 200

See application file for complete search history.

(56) References Cited

U.S. PATENT DOCUMENTS

| | | |
|---|---|---|
| 5,710,659 A | 1/1998 | Cline |
| 6,359,728 B1 | 3/2002 | Angellieri et al. |
| 6,456,426 B1 | 9/2002 | Bolshtyansky et al. |
| 2003/0035202 A1 | 2/2003 | Islam et al. |
| 2003/0053192 A1 | 3/2003 | Islam et al. |
| 2003/0053507 A1 | 3/2003 | Islam et al. |
| 2004/0091003 A1 | 5/2004 | Ogiwara et al. |
| 2004/0213512 A1* | 10/2004 | Wu et al. ........................ 385/27 |

* cited by examiner

*Primary Examiner* — Dung Nguyen

(74) *Attorney, Agent, or Firm* — James Harlan

(57) ABSTRACT

Optical amplification by combining two or more optical signals from separate optical fibers, amplifying the combined signal using an optical fiber, and separating the amplified signals into their constituent optical signals. The separated optical signals may then be sent further in the direction they had been heading before combination. This allows multiple optical signals to be amplified using a single optical amplifier, perhaps even in a single optical fiber. Although not required, the two optical signals may even be travelling in different directions.

17 Claims, 5 Drawing Sheets

OPTICAL AMPLIFIER CAPABLE OF AMPLIFYING OPTICAL SIGNALS THAT TRAVERSE SEPARATE TRANSMISSION FIBERS

CROSS-REFERENCE TO RELATED APPLICATIONS

This application claims benefit under 35 U.S.C. §119(e) of U.S. Provisional Application Ser. No. 61/019,467, entitled "OPTICAL AMPLIFIER CAPABLE OF AMPLIFYING OPTICAL SIGNALS THAT TRAVERSE SEPARATE TRANSMISSION FIBERS", filed Jan. 7, 2008, by Wayne S. Pelouch et al. This application also claims benefit under 35 U.S.C. §119(e) of U.S. Provisional Application Ser. No. 61/019,577, entitled "SYSTEM AND METHOD FOR EXPANDING THE BANDWIDTH OF AN OPTICAL AMPLIFIER", filed Jan. 7, 2008, by DO-IL Chang et al. This application also claims benefit under 35 U.S.C. §119(e) of U.S. Provisional Application Ser. No. 61/019,574, entitled "EFFICIENT DISCRETE AMPLIFICATION", filed Jan. 7, 2008, by DO-IL Chang et al.

BACKGROUND

Conventional optical communication systems typically implement one or more discrete in-line amplifiers to amplify an optical communication signal as it traverses a communication span or transmission fiber. These systems seek to compensate for losses associated with transmission through the transmission fiber by providing optical amplifiers for each transmission fiber at selected sites. Some conventional communication systems communicate only a relatively small number of optical channels. These systems typically desire a cost-effective optical amplifier to amplify the optical signals as they traverse the communication span or transmission fiber. However, the cost of an optical amplifier and other support equipment is not reduced linearly with a reduction in the number of optical signals, i.e. there are fixed costs that are required for the first optical channel.

BRIEF SUMMARY

Embodiments described herein relate to optical amplification by combining two or more optical signals from separate optical fibers, amplifying the combined signal using an optical fiber, and separating the amplified signals into their constituent optical signals. The separated optical signals may then be sent further in the direction they had been heading before combination. This allows multiple optical signals to be amplified using a single optical amplifier, perhaps even in a single optical fiber. Although not required, the two optical signals may even be travelling in different directions.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Particular examples and values (such as dimensions and wavelengths) specified throughout this document are for illustrative purposes only, and are not intended to limit the scope of the present disclosure. In particular, this disclosure is not limited to any particular type of optical communication system. The teachings of the present disclosure may be used in any optical communication system where it is desired to amplify optical signals traversing different optical fibers in the same discrete optical amplifier. Moreover, the illustrations in FIGS. 1 through 5 are not intended to be to scale.

Figure 1:
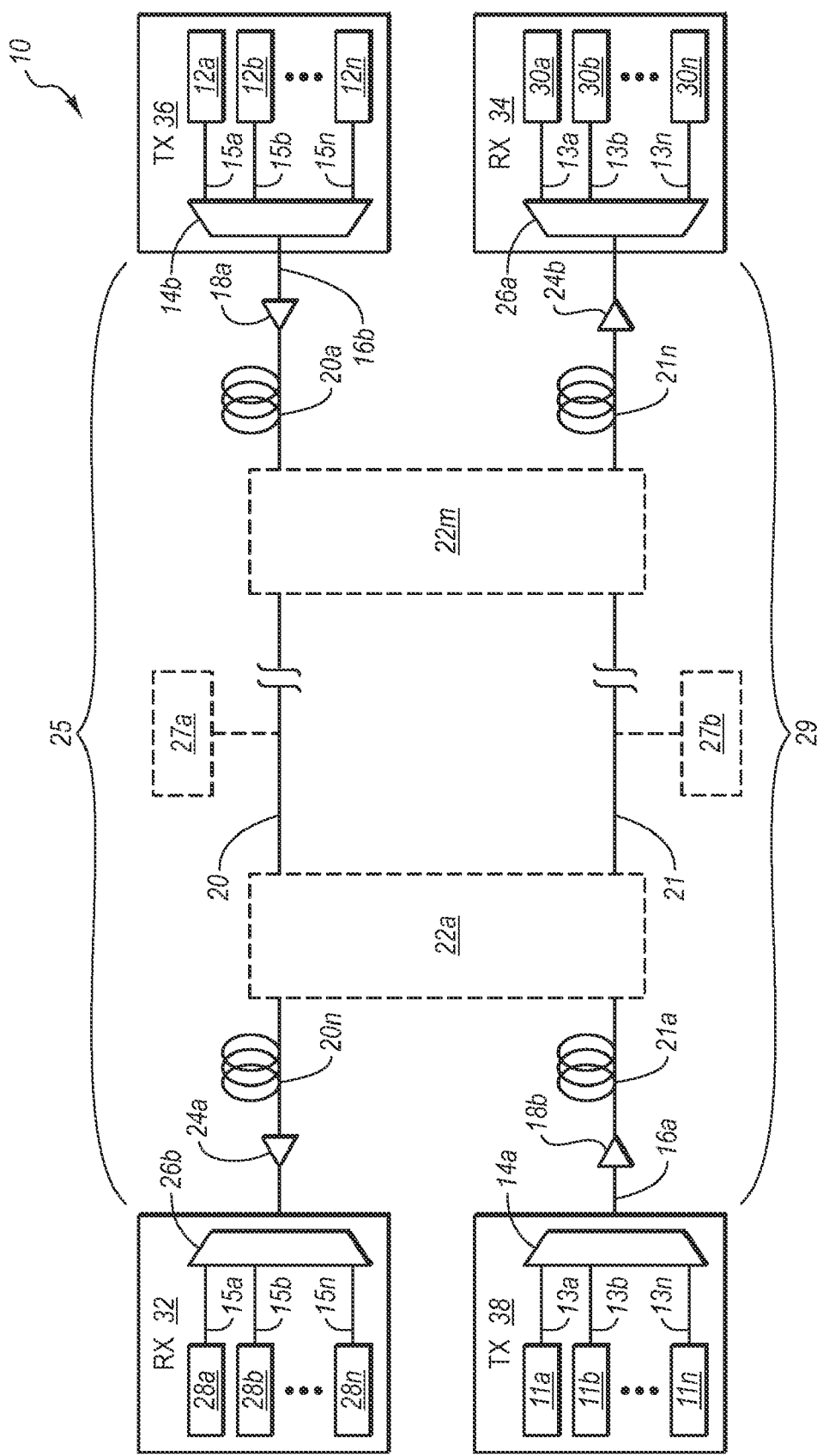
FIG. 1 is a block diagram showing at least a portion of an optical communication system operable to facilitate communication of one or more multiple wavelength signals using one or more discrete optical amplifiers capable of amplifying optical signals that traverse different optical communication spans.

FIG. 1 is a block diagram showing at least a portion of an example optical communication system 10 operable to facilitate communication of one or more multiple wavelength signals 16. In some embodiments, system 10 may comprise the entire optical communication system from beginning to end. In other embodiments, system 10 may comprise a portion of a larger optical communication system.

In this example, system 10 includes a plurality of transmitters 11a-11n and 12a-12n operable to generate a plurality of optical channels 13a-13n and 15a-15n, respectively, each comprising a center wavelength of light. In some embodiments, each optical channel 13 and 15 comprises a center wavelength that is substantially different from the center wavelengths of other channels 13 and 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength. Transmitters 11 and 12 can comprise any device capable of generating one or more optical channels. Transmitters 12 can comprise externally modulated light sources, or can comprise directly modulated light sources.

In one embodiment, transmitters 12 comprise a plurality of independent light sources each having an associated modulator, with each source being operable to generate one or more optical channels 15. Alternatively, transmitters 11 and 12 could comprise one or more light sources shared by a plurality of modulators. For example, transmitters 11 and 12 could comprise a continuum source transmitter operable to generate a multitude of optical signals. In that embodiment, a signal splitter receives the continuum and separates the continuum into individual channels each having a center wavelength. In some embodiments, transmitters 11 and 12 can also include a pulse rate multiplexer, such as a time division multiplexer, operable to multiplex pulses received from a mode locked source or a modulator to increase the bit rate of the system.

Transmitters 11 and 12, in some cases, may comprise a portion of an optical regenerator. That is, transmitters 11 and 12 may generate optical channels 13 and 15 based on electrical representations of electrical or optical signals received from other optical communication links. In other cases, transmitters 11 and 12 may generate optical channels 13 and 15 based on information received from sources residing locally to transmitters 12. Transmitters 11 and 12 could also comprise a portion of a transponder assembly (not explicitly shown), containing a plurality of transmitters and a plurality of receivers.

In various embodiments, transmitters 11 and 12 may include a forward error correction (FEC) encoder/decoder module capable improving the Q-factor of channels 13 and 15 and the bit-error rate of system 10. For example, the FEC module may encode an FEC sequence, such as, Reed-Solomon coding, Turbo Product Codes coding, Concatenated Reed-Solomon coding, or other algorithms capable of improving the Q-factor of channels 13 and 15 and the bit error rate of system 10. As used throughout this document, the term "Q-factor" refers to a metric for determining the quality of the signal communicated from a transmitter. The "Q-factor" associated with optical channels 13 and 15 communicated from transmitters 11 and 12 refers to the difference of the mean value of the high signal values ($M_H$) and the mean value of the low signal values ($M_L$) associated with an optical channel over the sum of the standard deviation of the multiple highs ($\Delta_H$) and the multiple lows $\Delta_L$). The value of the Q-factor can be expressed in $dB_{20}$. In equation form, this relationship is expressed as:

$$Q = [M_H - M_L] \div [\Delta_H + \Delta_L]$$

In some cases, multiple wavelength signals 16a and 16b can carry wavelength signals 13a-13n and/or 15a-15n ranging across a relatively wide bandwidth. In some implementations, wavelength signals 13a-13n and/or 15a-15n may even range across different communications bands (e.g., the short band (S-band), the conventional band (C-band), and/or the long band (L-band)).

In the illustrated embodiment, system 10 also includes combiners 14a and 14b operable to receive optical channels 13a-13n and 15a-15n, respectively, and to combine those channels into multiple wavelength signal 16a and 16b, respectively. As one particular example, combiners 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

System 10 communicates multiple wavelength signal 16a over optical communication spans 21a-21n and communicates multiple wavelength signal 16b over optical communication spans 20a-20n. Communication spans 20 and 21 can comprise, for example, standard single mode fiber (SMF), dispersion shifted fiber (DSF), non-zero dispersion shifted fiber (NZDSF), dispersion compensating fiber (DCF), pure-silica core fiber (PSCF), or another fiber type or combination of fiber types. In various embodiments, each of spans 20a-20n and 21a-21n can comprise any span length.

Spans 20 and 21 could comprise a point-to-point communication link, or could comprise a portion of a larger communication network, such as a ring network, a mesh network, a star network, or any other network configuration. For example, communication spans 20 and 21 could comprise one span or link of a multiple link system, where each link couples to other links through, for example, optical regenerators or wavelength selective switches. A link refers to a group of one or more spans with optical communication between two points through the spans.

One or more spans of communication medium 20 can collectively form an optical link 25 and one or more spans of communication medium 21 can collectively form an optical link 29. In the illustrated example, communication media 20 and 21 include a single optical link 25 and 29, respectively, comprising numerous spans 20a-20n and 21a-21n. System 10 could include any number of additional links coupled to links 25 and 29. For example, optical link 25 could comprise one optical link of a multiple link system, where each link is coupled to other links through, for example, optical regenerators or wavelength selective switches.

Optical links 25 and 29 could comprise point-to-point communication links, or could comprise portions of a larger communication network, such as a ring network, a mesh network, a star network, or any other network configuration.

System 10 may further include one or more access elements 27, such as access elements 27a and 27b. For example, access elements 27a or 27b could comprise an add/drop multiplexer, a cross connect, or another device operable to terminate, cross connect, switch, route, process, and/or provide access to and from optical links 25 and 29 and another optical link or communication device. System 10 may also include one or more lossy elements (not explicitly shown) and/or gain elements capable of at least partially compensating for the lossy element coupled between spans 20 of link 25, or between spans 21 of link 29. For example, the lossy element could comprise a signal separator, a signal combiner, an isolator, a dispersion compensating element, a circulator, or a gain equalizer.

In this embodiment, separators 26b separate individual optical signals 15a-15n from multiple wavelength signal 16b received at the end of link 25, while separator 26a separates individual optical signal 13a-13n from multiple wavelength signal 16a received at the end of link 29. Separators 26 may comprise, for example, wavelength division demultiplexers (WDM). Separators 26 communicate individual signal wavelengths or ranges of wavelengths to banks of receivers 28 and 30 and/or other optical communication paths. One or more of receivers 28 and 30 may comprise a portion of an optical transceiver operable to receive and convert signals between optical and electrical formats.

In the illustrated embodiment, transmitters 11 and 12 and receivers 28 and 30 reside within terminals 38, 36, 32, and 34, respectively. Terminals 32, 34, 36, and 38 can include both transmitters and receivers without departing from the scope of the present disclosure. Additionally, terminals 32, 34, 36, and 38 may include any other optical component, such as, combiner 14, booster amplifier 18, pre-amplifier 24, and/or separator 26 without departing from the scope of the present disclosure. In some cases, terminals 32, 34, 36, and 38 can be referred to as end terminals. The phrase "end terminal" refers to devices operable to perform optical-to-electrical and/or electrical-to-optical signal conversion and/or generation.

System 10 includes a plurality of optical amplifiers coupled to communication spans 20 and 21. In this example, system 10 includes booster amplifiers 18a and 18b operable to receive and amplify wavelengths of signals 16b or 16a in preparation for transmission over communication spans 20 or 21. Where communication system 10 includes a plurality of fiber spans 20a-20n and 21a-21n, system 10 can also include one or more in line amplifiers 22a-22m with or without co-propagating and/or counter-propagating (relative to the signal direction) distributed Raman amplification. In line amplifiers 22 couple to one or more spans 20a-20n and/or 21a-21n and operate to amplify signals 16b and/or 16a as they traverse communication spans 20 and 21, respectively. The illustrated example also implements preamplifiers 24a and 24b operable to amplify signals 16b and 16a, respectively, received from final fiber spans 20n and 21n, respectively, prior to communicating signals 16b and 16a to separators 26. Although optical links 25 and 29 are shown to include one or more booster amplifiers 18 and preamplifiers 24, one or more of the amplifier types could be eliminated in other embodiments. In another embodiment, any of the booster amplifiers 18a, 18b, 24a, and/or 24b may be replaced with inline amplifier 22.

Amplifiers 18, 22, and 24 could each comprise, for example, one or more stages of discrete Raman amplification stages, distributed Raman amplification stages, rare-earth doped amplification stages, such as erbium doped or thulium doped stages, semiconductor amplification stages or a combination of these or other amplification stage types. Throughout this document, the term "amplifier" denotes a device or combination of devices operable to at least partially compensate for at least some of the losses incurred by signals while traversing all or a portion of optical link 25. Likewise, the terms "amplify" and "amplification" refers to offsetting at least a portion of losses that would otherwise be incurred.

An amplifier may, or may not impart a net gain to a signal being amplified. Moreover, the terms "gain" and "amplify" as used throughout this document do not (unless explicitly specified) require a net gain. In other words, it is not necessary that a signal experiencing "gain" or "amplification" in an amplifier stage experience enough gain to overcome all losses in the amplifier stage or in the fiber connected to the amplifier stage. As a specific example, distributed Raman amplifier stages often do not experience enough gain to offset all of the losses in the transmission fiber that serves as a gain medium. Nevertheless, these devices are considered "amplifiers" because they offset at least a portion of the losses experienced in the transmission fiber.

Depending on the amplifier types chosen, one or more of amplifiers 18, 22, and/or 24 could comprise a wide band amplifier operable to amplify all signal wavelengths 13a-13n and 15a-15n received. Alternatively, one or more of those amplifiers could comprise a parallel combination of narrower band amplifier assemblies, wherein each amplifier in the parallel combination is operable to amplify a portion of the wavelengths of multiple wavelength signals 16b and/or 16a. In that case, system 10 could incorporate signal separators and/or signal combiners surrounding the parallel combinations of amplifier assemblies to facilitate amplification of a plurality of groups of wavelengths for separating and/or combining or recombining the wavelengths for communication through system 10.

Conventional optical communication systems typically implement a separate discrete amplifier that amplifies each of the optical signals traversing a particular unidirectional optical fiber. Unlike conventional communications systems, system 10 includes one or more discrete amplifiers 22a-22m capable of amplifying optical signals that traverse different optical fibers or communication spans. In other words, optical amplifiers 22a-22m operate to amplify each of optical signals 16a and 16b even though optical signals 16a and 16b each traverse a separate unidirectional optical communication span.

In this particular embodiment, each of signals 16a and 16b comprises approximately 30 optical channels. Although each of optical signals 16 in this example comprises approximately 30 optical channels, any other number of optical channels could be used without departing from the scope of the present disclosure. In this particular example, amplifiers 22 are capable of amplifying 60 optical channels. By using one discrete amplifier instead of multiple amplifiers to amplify optical signals traversing different optical fibers or communication spans, system 10 advantageously reduces the cost associated with amplification of the optical signals.

In this or other embodiments, system 10 may implement one or more dispersion management techniques to compensate for dispersion of signals 16a and/or 16b. For example, system 10 can implement a pre-compensation, an in-line compensation, and/or a post-compensation technique. These dispersion compensation techniques can include, for example, electronic dispersion compensation techniques, optical dispersion compensation techniques, or any other appropriate dispersion compensation technique. In various embodiments, terminals 32, 34, 36, and/or 38 can include one or more dispersion compensating elements capable of at least partially compensating for chromatic dispersion associated with signals 16a and/or 16b. In some embodiments, the dispersion compensating element can comprise a dispersion length product that approximately compensates for the dispersion accumulated by optical signals 16a and/or 16b while traversing spans 21 and/or 20 of system 10. In other embodiments, at least a portion of a gain medium of amplifiers 24a and/or 24b may comprise a dispersion compensating fiber that is capable of at least partially compensating for chromatic dispersion associated with signals 16a and/or 16b, respectively. In those embodiments, the dispersion compensating fiber can comprise a slope of dispersion that is equal to and opposite from the slope of chromatic dispersion associated with multiple wavelength signals 16a and/or 16b in spans 20 and/or 21.

Figure 2:
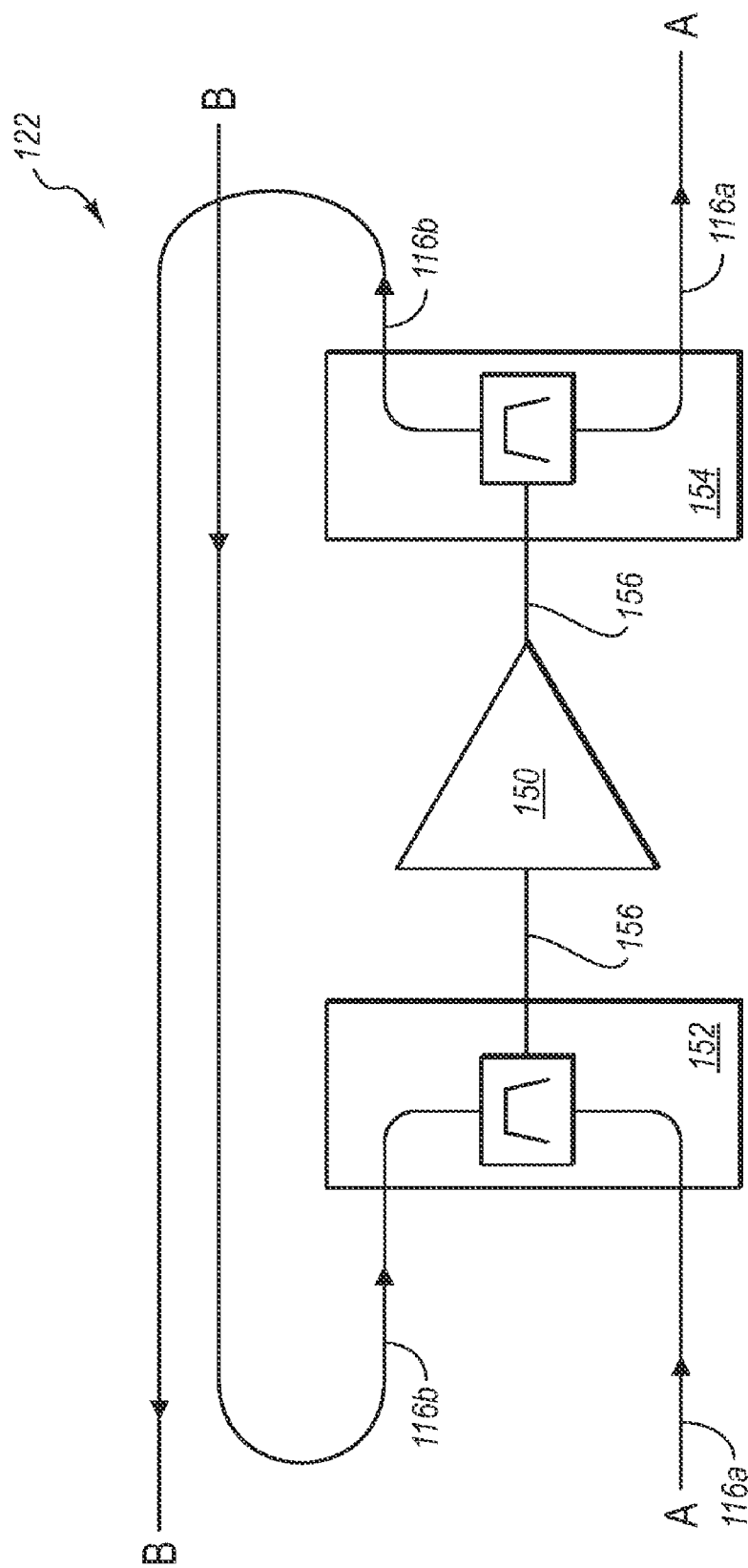
FIG. 2 is one example of a discrete optical amplifier capable of amplifying optical signals that traverse different optical fibers.

FIG. 2 is a block diagram of one example of an optical amplifier assembly 122 capable of amplifying optical signals that traverse different optical fibers or communication spans. Amplifier assembly 122 may, for example, be useful in system 10 of FIG. 1 as one of in-line amplifiers 22.

In the illustrated embodiment, amplifier assembly includes combiner 152 capable of receiving optical signals 116a and 116b and to combine those signals into optical signal 156. Optical signal 116a and 116b can be substantially similar in structure and function as optical signals 16a and 16b of FIG. 1, respectively. In this particular embodiment, each of optical signals 116a and 116b traverse a different optical fiber or communication span and comprises approximately 30 channels. In this particular embodiment, each of the wavelengths of optical signal 116a has a substantially different center wavelength than each of the wavelengths of optical signal 116b. In other embodiments, each of the wavelengths of optical signal 116a of may have substantially the same center wavelengths as the wavelengths of optical signal 116b.

Combiner 152 can comprise any device capable of combining optical signals 116a and 116b, such as, for example a wavelength division multiplexer (WDM) or an optical add/drop multiplexer (OADM). Throughout this disclosure the terms "add/drop," "adding/dropping," and "added/dropped" refer to either the operation of adding one or more wavelength signals, dropping one or more wavelength signals, or adding wavelength signals and dropping others. Those terms are not intended to require both add and drop operation, but are also not intended to exclude add and drop operations. The terms are merely used as a convenient way to refer to either adding or dropping or both adding and dropping operations.

In this particular embodiment, combiner 152 comprises a band WDM capable of combining bands of optical signal wavelengths. As used throughout this disclosure, the term "band" refers to two or more wavelength signals residing spectrally adjacent to one another. As used throughout this disclosure, the term "spectral edge" refers to the wavelength contained within a band of wavelengths that is immediately adjacent to a wavelength not included within that particular band of wavelengths.

Amplifier assembly 122 also includes an amplifier module 150 capable of amplifying optical signal 156. Amplifier module 150 could comprise, for example, one or more stages of discrete Raman amplification stages, distributed Raman amplification stages, rare-earth doped amplification stages, such as erbium doped or thulium-doped stages, semiconductor amplification stages or a combination of these or other amplification stage types. In this particular embodiment, amplifier module comprises a discrete Raman amplification stage capable of amplifying at least 60 optical channels. Although amplification module 150 is capable of amplifying 60 channels in this example, amplification module 150 could amplify any other number of channels without departing from the scope of the present disclosure. In some embodiments, amplification module 150 may be capable of amplifying 60 optical channels within, for example, a bandwidth of 1543 nm to 1567 nm.

In this particular embodiment, amplifier assembly 122 includes a separator 154 capable of separating optical signal 156 into optical signals 116a and 116b. Separator 154 can comprise any device capable of separating optical signal 156 into optical signals 116a and 116b, such as, for example a wavelength division multiplexer (WDM) or an optical add/drop multiplexer (OADM). In this particular embodiment, separator 154 comprises a band WDM capable of separating bands of optical signal wavelengths. Separator 154 may be the same as combiner 152 being used in the opposite signal direction.

In this example, amplifier assembly 122 receives optical signal 116a traversing an optical fiber in a first direction (the 'A' direction) and receives optical signal 116b traversing a different optical fiber in a second direction (the 'B' direction). In this particular embodiment each of optical signals 116a and 116b comprises 27 optical channels. In various embodiments, direction 'A' can be opposite of direction 'B', in the same as direction 'B', or can be different than direction 'B'.

Combiner 152 operates to combine signals 116a and 116b into optical signal 156 for amplification by amplification module 150. After amplification, separator 154 receives optical signal 156 and operates to separate optical signal 156 back into optical signals 116a and 116b. Optical signal 116a is then communicated in direction 'A', while optical signal 116b is communicated in direction 'B'.

In an alternative embodiment, the combiner 152 may have more than two input optical signals that are combined into optical signal 156. Similarly, separator 154 may separate optical signals 156 into more than two output signals. These embodiments may, for example, allow amplifier assembly 122 to be used with more than two transmission fibers or, for example, to be used with a wavelength selective switch.

In an alternative embodiment, amplification assembly 122 could include one or more optical pumps (not shown) capable of providing distributed Raman amplification to optical signals 116a and/or 116b before receipt by combiner 152 (in the counter-propagating direction) or after separator 154 (in the co-propagating direction). The foregoing optical pumps for Raman amplification may consist of separate optical pump modules for each or any of the optical fibers. In other embodiments, a single optical pump module may be split in any ratio in order to provide Raman amplification to any combination of two or more optical fibers in either and/or both co-propagating and counter-propagating directions.

The combiner 152 and/or separator 154 may perform additional functions. For example, in some optical communication systems, an optical supervisory channel (OSC) is transmitted and received over each span for purposes that may include equipment communication and/or customer communication. The OSC may be transmitted along both optical fiber directions A (OSC-A) and B (OSC-B). The combiner 152 may include a method to separate the OSC-A from optical signals 116a and/or OSC-B from optical signals 116b, either to receive the OSC or to direct the OSC to a receiver outside of the combiner 152. Alternatively, the combiner 152 may combine OSC-A and/or OSC-B with optical signal 156 where OSC-A and/or OSC-B may be separated and/or received in optical amplifier 150 or another module. The separator 154 may include a method to combine the OSC-A with optical signals 116a and/or combine OSC-B with optical signals 116b. The separator 154 may additionally transmit OSC-A and/or OSC-B before combining the OSC with the optical signals. Alternatively, the OSC-A and/or OSC-B may be combined with optical signals 156 before the separator 154 instead of being transmitted from separator 154.

The amplifier assembly 122 may be converted, for example at a later time, into a more conventional amplifier configuration by removing combiner 152, removing separator 154, connecting input optical signal 116a into amplifier 150, connecting the output of amplifier 150 to output signal 116a, providing a new amplifier which may or may not be the same as amplifier 150, and connecting optical signals 116b to the new amplifier. This converted configuration would allow more channels to be added to optical signal 116a and 116b and provide an ability to upgrade system channel capacity.

Figure 3:
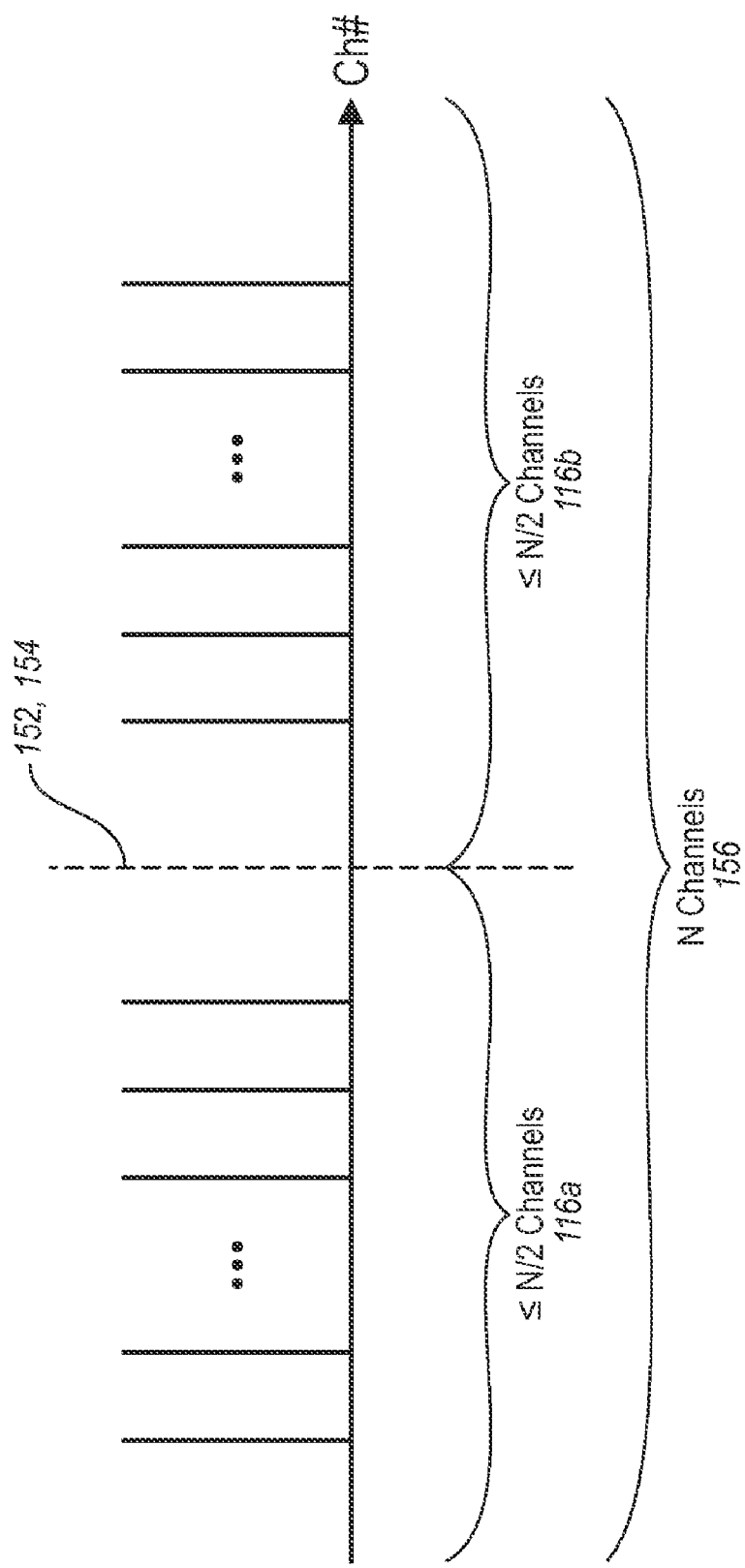
FIG. 3 is one example of optical channels capable of being amplified in a discrete optical amplifier capable of amplifying optical signals that traverse different optical fibers.

FIG. 3 is one example of the spectrum of optical signal 156 capable of being amplified in a discrete optical amplifier capable of amplifying optical signals that traverse different optical fibers. In this particular embodiment, each of optical signals 116a and 116b comprises 27 distinct optical channels. Although each of optical signals 116 includes 27 channels in this example, any other number of channels may be used without departing from the scope of the present disclosure. If the amplifier 150 of FIG. 2 can amplify N channels, then optical signals 116a and 116b may consist of less than or equal to N/2 channels each. The dashed line 152, 154 symbolically represents the WDM combiner 152 and/or separator 154 of FIG. 2. In the example of FIG. 3 the optical signals 116a and 116b are in separate bands and the combiner 152 and separator 154 combine and separate the two non-overlapping bands 116a and 116b. In another embodiment the optical signals 116a and 116b of FIG. 2 may have overlapping bands and may be combined and separated using, for example, an interleaver (not shown) which can, for example, combine two groups of 100-GHz-space channels that have center frequencies that differ by 50 GHz into one group of 50-GHz spaced channels. In general, the combiner and separator can use methods known to those skilled in the art to combine and/or separate a group of N signals into two or more groups of less than or equal to N/2 signals.

Figure 4:
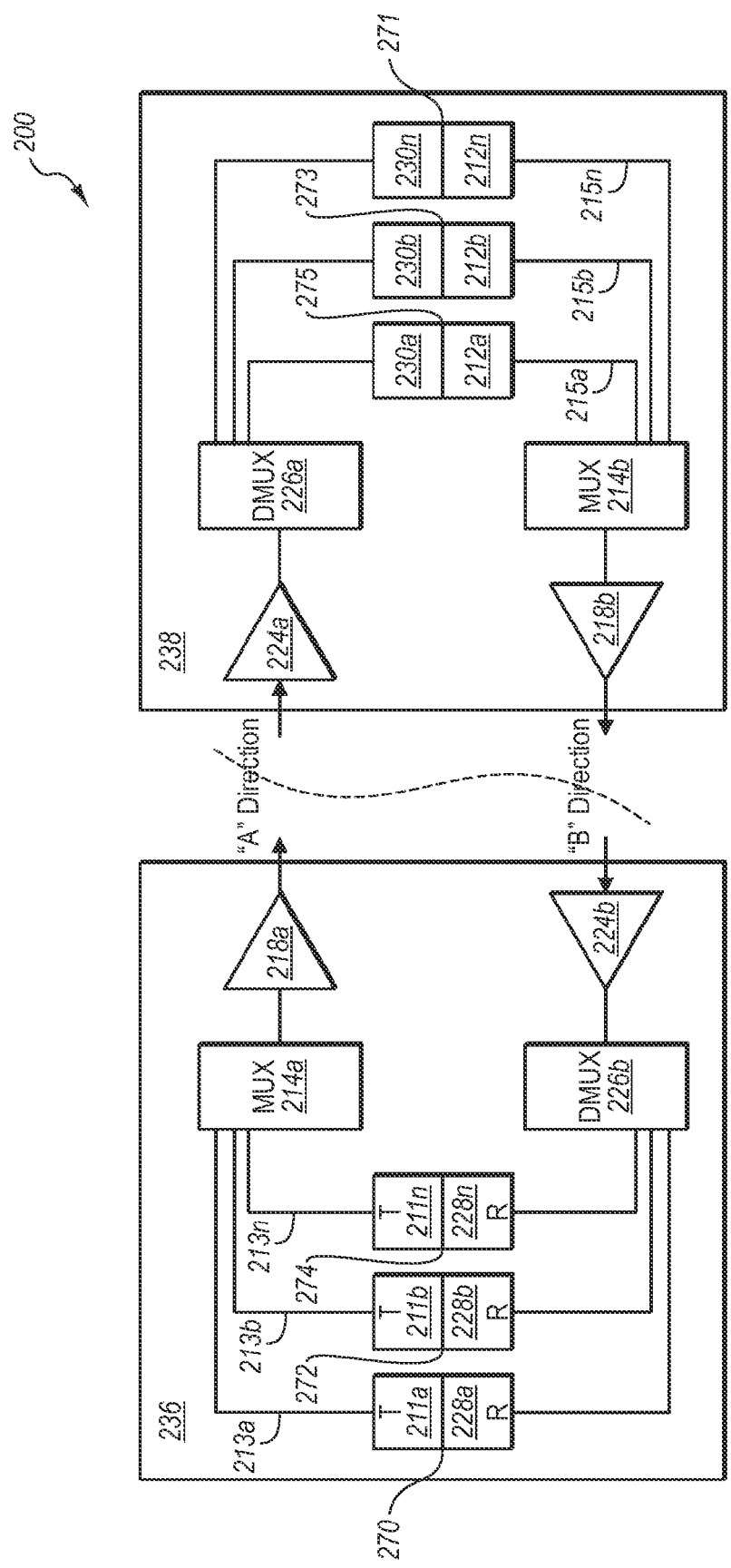
FIG. 4 is one example of end terminals that transmit and receive optical signals in a communication system that uses a discrete optical amplifier capable of amplifying optical signals that traverse different optical fibers.

FIG. 4 is one example of end terminals 236 and 238 in a communication system 200 that uses an in-line optical amplifier capable of amplifying optical signals that traverse different optical fibers. In this particular example, communication system 200 includes end terminals 236 and 238. Communication system 200 can be substantially similar in structure and function to communication system 10 of FIG. 1. In various embodiments, end terminals 236 and 238 can be similar in structure and function to terminals 32, 36 and 34, 38 of FIG. 1. In this example, end terminal 236 includes transmitters 211a-211n, combiner 214a, booster amplifier 218a, pre-amplifier 224b, separator 226b, and receivers 228a-228n. The structure and function of transmitters 211a-211n, combiner 214a, booster amplifier 218a, pre-amplifier 224b, separator 226b, and receivers 228a-228n can be substantially similar to the structure and function of transmitters 11a-11n, combiner 14a, booster amplifier 18a, pre-amplifier 24b, separator 26b, and receivers 28a-28n of FIG. 1.

In this example, end terminal 238 includes transmitters 212a-212n, combiner 214b, booster amplifier 218b, pre-amplifier 224a, separator 226a, and receivers 230a-230n. The structure and function of transmitters 212a-212n, combiner 214b, booster amplifier 218b, pre-amplifier 224a, separator 226a, and receivers 230a-230n can be substantially similar to the structure and function of transmitters 12a-12n, combiner 14b, booster amplifier 18b, pre-amplifier 24a, separator 26a, and receivers 30a-30n of FIG. 1.

In this particular example, the optical channel for optical signal wavelength 213a in the 'A' direction may be received by receiver 230n and correspond to the optical channel for the optical signal wavelength 215n in the 'B' direction. In this example, optical signal wavelength 213a and optical signal wavelength 215n would comprise substantially different center wavelengths. In a typical optical communications terminal, optical signal wavelength 213a in the 'A' direction would be substantially the same as optical signal wavelength 215n in the 'B' direction.

In this example, each transmitter/receiver pair comprises a transponder. For example, transmitter 21a and receiver 228a form transponder 270. Transponders 270-275 can both transmit and receive signals. Transponder 270, for example, can transmit signal 213a in this embodiment, which is received by transponder 271. Transponder 271 will then transmit signal 215n, which will be received by transponder 270. Accordingly, transponder 272 corresponds to transponder 273, and transponder 274 corresponds to transponder 275. Similar transponder pairs can be included for all the other channels used in the communications system.

Figure 5:
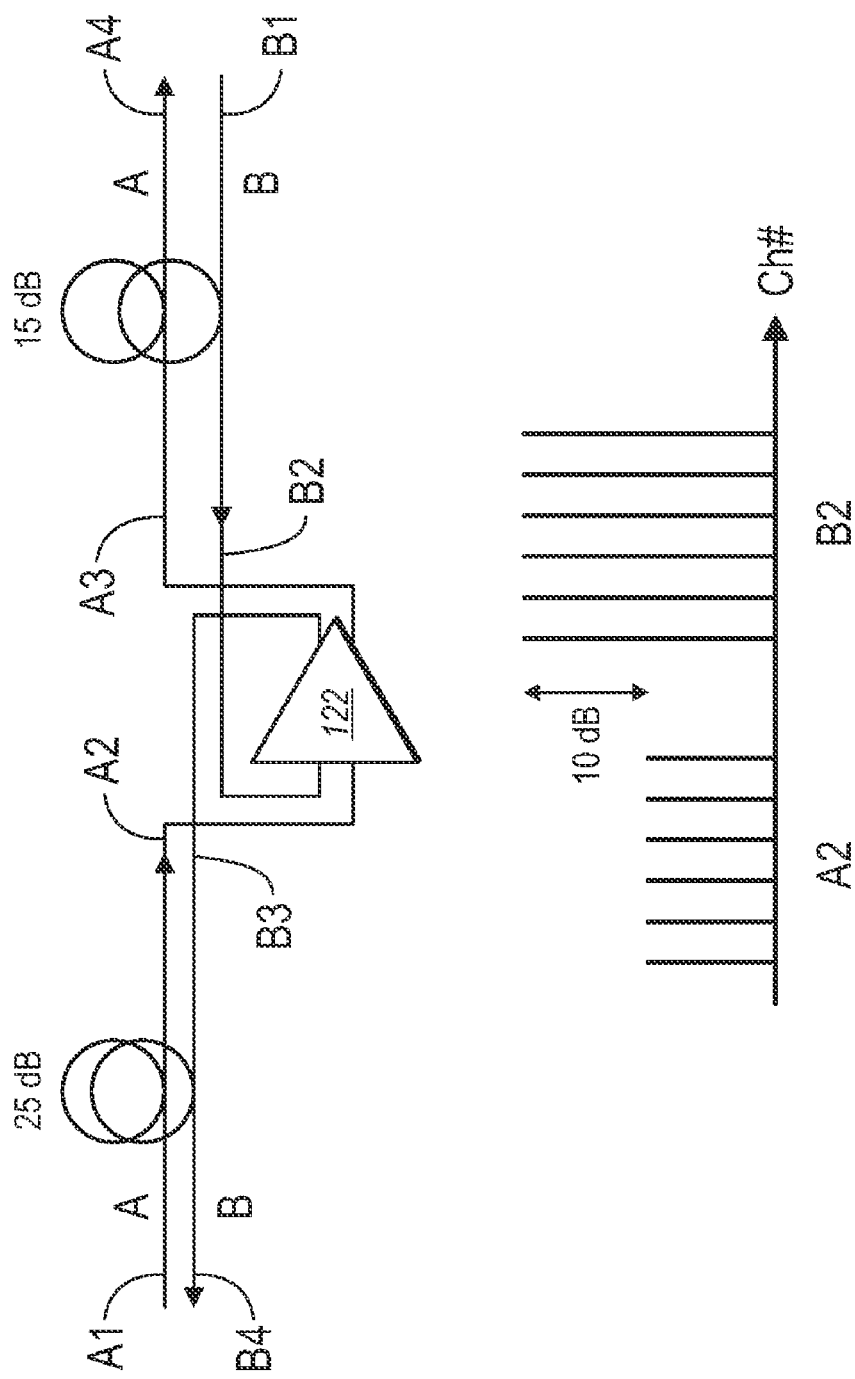
FIG. 5 is one example of a diagram illustrating power differentials that may result in the channels in a discrete optical amplifier capable of amplifying optical signals that traverse different optical fibers.

FIG. 5 shows one example of the different input powers that may occur in amplifier 150 of FIG. 2. For example, the A and B directions may have different power levels going into the amplifier, due to different losses or gains in the transmission lines and/or due to different optical powers at A1 and B1. This can occur, for example, if the transmission lines for the A and B directions are a different length. In this example as shown in FIG. 5, the A signals at the input of the amplifier A2 experience 25 dB loss from A1, and the B signals at the input of the amplifier B2 experience 15 dB loss from B1. Therefore, in this example, if the optical power of the signals at A1 and B1 are on average the same, then there may be a 10 dB difference in optical power between the signals A2 and B2 when entering the amplifier. In some embodiments, the power levels can be partially or fully equalized before entering the amplifier. For example, optical signals B2 could be attenuated before entering the amplifier so that the optical power levels of A2 and B2 are more similar. For example, distributed Raman amplification may be used to add extra gain to, for example, optical signals between A1 and A2 so that the optical power levels of A2 and B2 are more similar. The distributed Raman amplification may be implemented in the co-propagating and/or counter-propagating direction with respect to the signal direction.

The power levels do not have to be exactly equal when the signals enter the amplifier; some difference can be accommodated by the amplifier without significant impact on the output power spectrum. Typically, the amplifier provides approximately constant gain across the signal spectrum such that the output spectrum at A3 and B3 look similar to the input spectrum at A2 and B2 (with the additional net gain of the amplifier). If the optical power of the B2 signals is too high relative to A2, then there may be some amplifier saturation effects that distort the output spectrum. If the difference in the optical power of the A and B signals at the input of the amplifier is not too much, then there may be negligible distortion of the output signal spectrum. It is also possible that the amplifier can provide different gain for signals 116b of FIG. 2 and/or FIG. 3. In this case, the amplifier provides a means for the partial or full equalization of the powers of signals 116a and 116b of FIGS. 2 and/or 3. This may be achieved, for example, by using a C-band Erbium doped amplifier for one of the signals and an L-band Erbium doped amplifier for the other of the signals; or, for example, by controlling the spectral gain shape of a discrete Raman amplifier (the gain shape being controlled by Raman pumps with different wavelengths).

Additionally, the system experiences some self-correcting of the power differential once the signals have traveled across the entire communication link. For example, in FIG. 5 if the optical power of the signals A1 is the same as the signals B1 then the amplifier output power of the optical signals B3 may be approximately 10 dB higher than the optical power of the optical signals A3 (when not trying to equalize the power as discussed previously). However, after signals B3 transmit through the 25-dB span, the optical power at B4 will be similar to the optical power at A4 since the loss from A3 to A4 is 10 dB less than from B3 to B4. In other words, the higher power channels out of the amplifier will be sent to the long span, and the lower power channels out of the amplifier will be sent to the short span. The higher power channels will lose more power than the lower power channels as they traverse the span. So at each receiving terminal, the power in the channels will be closer to equality.

Although the present disclosure has been described with several embodiments, a myriad of changes, variations, alterations, transformations, and as modifications may be suggested to one skilled in the art, and it is intended that the present disclosure encompass such changes, variations, alterations, transformations, and modifications as fall within the scope of the appended claims.

What is claimed is:

1. An optical amplifier assembly, comprising:
 a combiner adapted to combine a first optical signal received from a first transmission fiber and a second optical signal received from a second transmission fiber into a third optical signal, the first optical signal comprising a first plurality of optical signal wavelengths and the second optical signal comprising a second plurality of wavelengths, wherein the first optical signal traverses the first transmission fiber in a first direction in a bi-directional optical link in which signals traveling from a first transmitter to a first receiver, and the second optical signal traverses the second transmission fiber in a second direction in the bi-directional optical link in which signals traveling from a second transmitter to a second receiver, wherein the first and second transmitters are remotely located from each other, and wherein the first and second receivers are remotely located from each other;

an amplifier operable to receive the third optical signal and to amplify each of the wavelengths in the third optical signal; and a separator operable to receive the third optical signal and to separate the third optical signal into the first optical signal and the second optical signal, wherein the first optical signal is communicated in the first direction and the second optical signal is communicated in the second direction after being separated by the separator.

2. The optical amplifier assembly of claim 1, wherein each of the plurality of wavelengths of the first optical signal are substantially different than each of the plurality of wavelengths of the second optical signal.

3. The optical amplifier assembly of claim 1, wherein the amplifier operates to provide a first level of amplification to the first plurality of optical signal wavelengths and a second level of amplification to the second plurality of optical signal wavelengths.

4. The optical amplifier assembly of claim 3, wherein the first level of amplification is different than the second level of amplification.

5. The optical amplifier assembly of claim 1, wherein the third optical signal counter-propagates at least a portion of a Raman gain medium of the amplifier with at least a portion of a pump signal.

6. The optical amplifier assembly of claim 1, wherein the third optical signal co-propagates at least a portion of a Raman gain medium of the amplifier with at least a portion of a pump signal.

7. The optical amplifier assembly of claim 1, wherein the separator is further adapted to perform 1) separation of a first optical supervisory channel from the first optical signal or 2) separation of a second optical supervisory channel from the second optical signal, or 3) both separation of the first optical supervisory channel from the first optical signal and separation of the second optical supervisory channel from the second optical signal.

8. A method of amplifying optical signals, comprising:

an act of receiving a first optical signal from a first transmission fiber, the first optical signal traversing the first transmission fiber in a first direction in a bi-directional optical link in which signals traveling from a first transmitter to a first receiver, the first optical signal comprising a first plurality of optical signal wavelengths;

an act of receiving a second optical signal from a second transmission fiber, the second optical signal traversing the second transmission fiber in a second direction in the bi-directional optical link in which signals traveling from a second transmitter to a second receiver, the second optical signal comprising a second plurality of optical signal wavelengths, wherein the first and second transmitters are remotely located from each other, and wherein the first and second receivers are remotely located from each other;

an act of combining the first plurality of optical signal wavelengths and the second plurality of optical signal wavelengths into a third optical signal comprising the first and second plurality of optical signal wavelengths;

an act of amplifying each of the wavelengths of the third optical signal;

after amplification, an act of separating the third optical signal into the first optical signal comprising the first plurality of optical signal wavelengths and the second optical signal comprising the second plurality of optical signal wavelengths; and after separation, communicating the first optical signal in the first direction towards the first receiver and the second optical signal in the second direction towards the second receiver.

9. The method of claim 8, wherein each of the plurality of wavelengths of the first optical signal are substantially different than each of the plurality of wavelengths of the second optical signal.

10. The method of claim 8, wherein the act of amplifying operates to provide a first level of amplification to the first plurality of optical signal wavelengths and a second level of amplification to the second plurality of optical signal wavelengths.

11. The method of claim 10, wherein the first level of amplification is different than the second level of amplification.

12. The method of claim 8, wherein the third optical signal counter-propagates at least a portion of a Raman gain medium of the amplifier with at least a portion of a pump signal.

13. The method of claim 8, wherein the third optical signal co-propagates at least a portion of a Raman gain medium of the amplifier with at least a portion of a pump signal.

14. An optical amplifier assembly, comprising:

a combiner adapted to combine a first optical signal received from a first transmission fiber and a second optical signal received from a second transmission fiber into a third optical signal, wherein the first optical signal traverses the first transmission fiber in a first direction in a bi-directional optical link in which signals traveling from a first transmitter to a first receiver, the second optical signal traverses the second transmission fiber in a second direction in the bi-directional optical link in which signals traveling from a second transmitter to a second receiver, wherein the first and second transmitters are remotely located from each other, and wherein the first and second receivers are remotely located from each other, the first optical signal comprising a first plurality of optical signal wavelengths and the second optical signal comprising a second plurality of wavelengths, wherein each of the plurality of wavelengths of the first optical signal are substantially different than each of the plurality of wavelengths of the second optical signal;

a discrete optical amplifier operable to receive the third optical signal and to amplify each of the optical signal wavelengths in the third optical signal; and a separator operable to receive the third optical signal and to separate the third optical signal into the first optical signal and the second optical signal, wherein the first optical signal is communicated in the first direction and the second optical signal is communicated in the second direction after being separated by the separator.

15. The optical amplifier assembly of claim 14, wherein the discrete optical amplifier amplifies each of the optical signal wavelengths of the third optical signal using Raman amplification.

16. The optical amplifier assembly of claim 14, wherein the first optical signal traverses the first transmission fiber in a first direction that is different than a second direction that the second optical signal traverses the second transmission fiber.

17. An optical amplifier assembly, comprising:

a combiner adapted to combine a first optical signal received from a first transmission fiber and a second optical signal received from a second transmission fiber into a third optical signal, the first optical signal comprising a first plurality of optical signal wavelengths and the second optical signal comprising a second plurality of wavelengths, wherein the first optical signal traverses the first transmission fiber in a first direction, and the second optical signal traverses the second transmission fiber in a second direction;

an amplifier operable to receive the third optical signal and to amplify each of the wavelengths in the third optical signal; and a separator operable to receive the third optical signal and to separate the third optical signal into the first optical signal and the second optical signal, wherein the first optical signal is communicated in the first direction and the second optical signal is communicated in the second direction after being separated by the separator, wherein the separator is further adapted to perform 1) separation of a first optical supervisory channel from the first optical signal or 2) separation of a second optical supervisory channel from the second optical signal, or 3) both separation of the first optical supervisory channel from the first optical signal and separation of the second optical supervisory channel from the second optical signal.

* * * * *